(12) United States Patent
Portes et al.

(10) Patent No.: US 11,646,977 B2
(45) Date of Patent: May 9, 2023

(54) AVIONIC SYSTEM OF AN AIRCRAFT

(71) Applicant: Airbus Operations SAS, Toulouse (FR)

(72) Inventors: Dominique Portes, Toulouse (FR);
Sylvain Sauvant, Toulouse (FR); Gilles Lartigue, Toulouse (FR); Bertrand Deshayes, Toulouse (FR); Sébastien Lefebvre, Blagnac (FR)

(73) Assignee: AIRBUS OPERATIONS SAS, Toulouse (FR)

(*) Notice: Subject to any disclaimer, the term of this patent is extended or adjusted under 35 U.S.C. 154(b) by 195 days.

(21) Appl. No.: 17/096,084

(22) Filed: Nov. 12, 2020

(65) Prior Publication Data
US 2021/0152492 A1    May 20, 2021

(30) Foreign Application Priority Data

Nov. 18, 2019 (FR) ...................... 1912834

(51) Int. Cl.
*H04L 49/25* (2022.01)
*H04L 49/35* (2022.01)
*H04L 67/12* (2022.01)

(52) U.S. Cl.
CPC .............. *H04L 49/25* (2013.01); *H04L 49/35* (2013.01); *H04L 67/12* (2013.01)

(58) Field of Classification Search
CPC ....................................................... H04L 49/25
See application file for complete search history.

(56) References Cited

U.S. PATENT DOCUMENTS

| | | | |
|---|---|---|---|
| 10,541,944 B1* | 1/2020 | Nelson | H04L 43/0847 |
| 2014/0180504 A1 | 6/2014 | Fervel et al. | |
| 2015/0103734 A1* | 4/2015 | Bobrek | H04L 47/2441 370/316 |
| 2016/0285699 A1* | 9/2016 | Lopez | H04L 5/14 |
| 2016/0294697 A1 | 10/2016 | Varadarajan et al. | |
| 2016/0294720 A1* | 10/2016 | Varadarajan | H04L 47/58 |
| 2019/0196927 A1* | 6/2019 | Bosson | G06F 11/0796 |
| 2020/0228465 A1* | 7/2020 | Fitterer | H04L 49/351 |

FOREIGN PATENT DOCUMENTS

| | | |
|---|---|---|
| FR | 2999152 A1 | 6/2014 |
| FR | 3034272 A1 | 9/2016 |

OTHER PUBLICATIONS

French Search Report; priority document.

* cited by examiner

*Primary Examiner* — Jason E Mattis
(74) *Attorney, Agent, or Firm* — Greer, Burns & Crain, Ltd.

(57) ABSTRACT

The avionic system of an aircraft includes a set of avionic computers and a switch associated with each avionic computer. For each avionic computer of the set of avionic computers, the avionic system includes a communication link between the switch associated with this avionic computer and each of the switches associated with the other avionic computers. Each switch is configured such that it routes the data frames received on its input ports to its output ports in a manner predefined only on the basis of the input ports on which these data frames are received. The various switches are configured such that, when an avionic computer sends a data frame, this data frame is transmitted to all of the other avionic computers.

12 Claims, 5 Drawing Sheets

AVIONIC SYSTEM OF AN AIRCRAFT

CROSS-REFERENCES TO RELATED APPLICATIONS

This application claims the benefit of the French patent application No. 1912834 filed on Nov. 18, 2019, the entire disclosures of which are incorporated herein by way of reference.

FIELD OF THE INVENTION

The invention relates to the field of communications between avionic computers of an avionic system of an aircraft. An aircraft has avionic computers such as, for example, flight control computers, FMS (flight management system) flight management computers, FWS (flight warning system) warning management computers, etc. These avionic computers usually communicate with one another through a communication network of the aircraft, this communication network being, for example, in accordance with the ARINC 664 part 7 standard. Such a communication network is a deterministic switched Ethernet network using virtual links that makes it possible to guarantee the transmission of data frames between the computers with a guaranteed latency time. When a switch receives a data frame on an input port, it analyses this frame in order to determine the corresponding virtual link, and then it determines the output ports on which it should retransmit this data frame, on the basis of a routing table stored in memory. However, in some specific situations, in particular in the case of an avionic system having a limited number of avionic computers, such as, for example, a flight control system, such a communication network is expensive to implement. Specifically, it requires configuring, in the switches, routing tables corresponding to the various virtual links. In addition, the mass and the bulk of the switches increase the cost of the aircraft.

SUMMARY OF THE INVENTION

The present invention aims, in particular, to provide a solution to this problem. It relates to an avionic system of an aircraft, the avionic system comprising:
  a set of avionic computers; and
  a switch associated with each avionic computer of the set of avionic computers, each switch comprising a set of input ports and a set of output ports.

The avionic system is noteworthy in that, for each avionic computer of the set of avionic computers, the avionic system comprises a communication link between the switch associated with this avionic computer and each of the switches associated with the other avionic computers of the set of avionic computers,
  and in that:
  each switch is configured such that it routes the data frames received on its input ports to its output ports in a manner predefined only on the basis of the input ports on which these data frames are received; and
  the various switches are configured such that, when an avionic computer sends a data frame via the switch associated with this avionic computer, this data frame is transmitted to all of the other avionic computers of the set of avionic computers.

Routing of the data frames received by a switch is thus simplified in comparison with the prior art, since a data frame received by the switch is routed in a manner predefined only on the basis of the input port on which this data frame is received. It is, therefore, not necessary for the switch to analyze the content of the received data frames in order to route them. In addition, it is not necessary to configure a routing table for virtual links in the switch. Although it is simplified, the routing of the data frames is by no means uniform routing. Specifically, the predefined aspect of the routing is different for at least two input ports of a switch. The predefined routing is thus such that, for a different first port and second port of the switch, the received frames are routed to at least one third port, different from the first port or from the second port, only if these frames are received by the first port or else (exclusive or) by the second port. For example, if the predefined routing is such that the frames received by the first port are routed to this third port, then this routing is such that the frames received by the second port are not routed to this third port (or vice versa). This does not however rule out there possibly furthermore being a fourth port for which the received frames, received both by the first port and by the second port, are routed to this fourth port.

In one embodiment, the switch associated with each avionic computer is integrated into the avionic computer.

In one particular embodiment, the set of avionic computers comprises pairs of avionic computers such that each pair comprises a first computer acting in control mode and a second computer acting in monitoring mode monitoring the first computer and, for each pair of computers, the switch associated with the first computer is also the switch associated with the second computer.

In one embodiment, a maximum bandwidth is allocated to each input port of each switch associated with an avionic computer and the switch is configured so as to monitor the reception of data frames on an input port and to reject received frames if the maximum bandwidth allocated to this input port is exceeded. In particular, according to a first alternative, the switch is then configured so as to monitor the reception of data frames on an input port in accordance with a token bucket principle. According to a second alternative, the avionic system is configured so as to allow the transmission of a number N of data flows via an input port of a switch, N being an integer greater than 1, and the switch is configured so as to monitor the reception of data frames on an input port in accordance with a token bucket principle by implementing N token bucket counters, the counter having the highest value being decremented when a data frame is received on the input port if this highest value is high enough to authorize the reception of the data frame.

In one embodiment, the data frames exchanged between the avionic computers of the set of avionic computers are of identical sizes, corresponding to a predetermined size. Advantageously, a switch associated with an avionic computer is configured so as to reject the reception of a data frame on an input port if the size of the data frame is different from the predetermined size.

In one particular embodiment, the data frames exchanged between the avionic computers of the set of avionic computers are in accordance with the ARINC 664 part 7 standard (or any replacement standard).

Advantageously, all of the switches are configured similarly so as to route the data frames received on their input ports to their output ports in a manner predefined only on the basis of the input ports on which these data frames are received.

In one particular embodiment, the avionic system corresponds to a flight control system of the aircraft and the avionic computers of the set of avionic computers are flight control computers of the aircraft.

The invention also relates to an aircraft comprising such an avionic system.

BRIEF DESCRIPTION OF THE DRAWINGS

The invention will be better understood on reading the following description and on examining the appended figures.

DETAILED DESCRIPTION OF THE PREFERRED EMBODIMENTS

Figure 1:
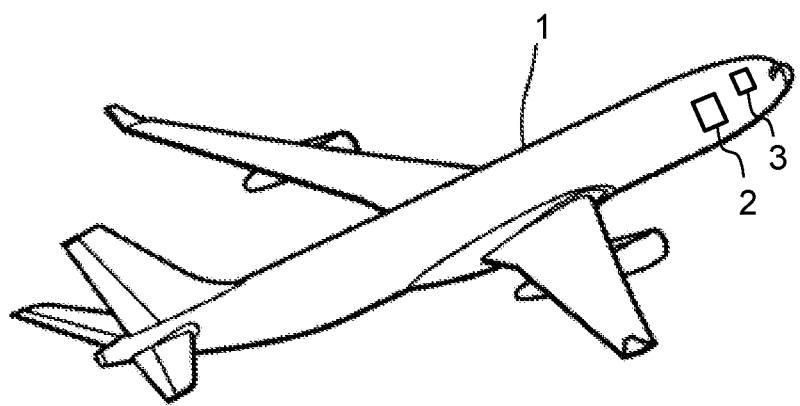
FIG. 1 is a view of an aircraft comprising an avionic system according to one embodiment of the invention.
Figure 2A:
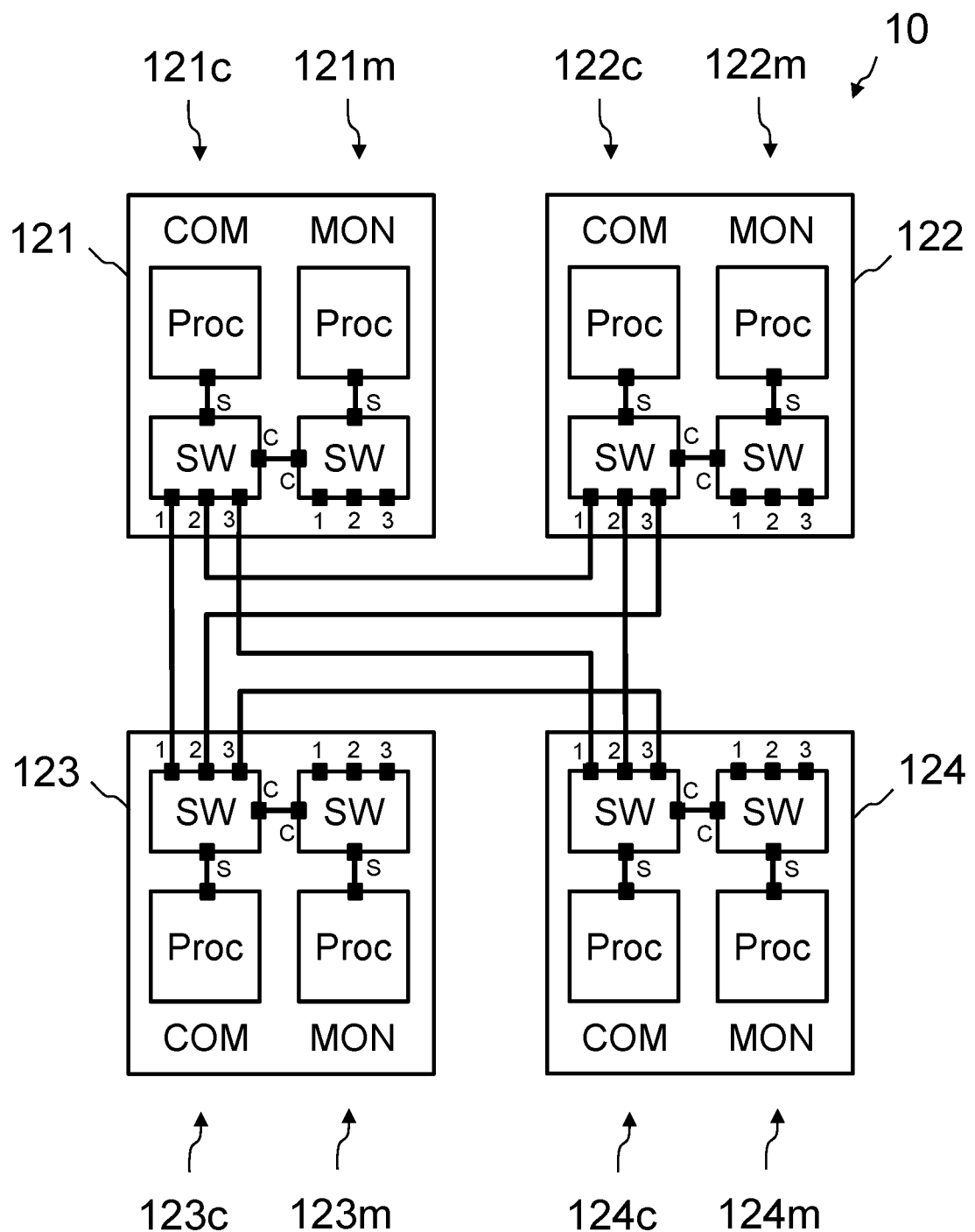
FIG. 2A schematically illustrates an avionic system according to one embodiment of the invention.

The avionic system 10 shown in FIG. 2A comprises a set of avionic computers 121c, 121m, 122c, 122m, 123c, 123m, 124c, 124m. The avionic system 10 is, for example, integrated into an avionics bay 2 of an aircraft 1 as shown in FIG. 1. The avionics bay 2 is, for example, located close to a cockpit 3 of the aircraft. In the particular example shown in FIG. 2A, the avionic computers are avionic computers of a flight control system of the aircraft. These computers are then grouped together in pairs 121, 122, 123, 124, each pair comprising a first computer 121c, 122c, 123c, 124c, labelled COM in the figure and acting in control mode. Each pair comprises a second computer 121m, 122m, 123m, 124m, labelled MON in the figure and acting in monitoring mode monitoring the first computer acting in control mode. The control mode and the monitoring mode are such that, when the pair of computers under consideration is active, the first computer COM acting in control mode and the second computer MON acting in monitoring mode both determine similar flight control orders. The orders used to control actuators of the aircraft are those from the first computer COM acting in control mode. The orders from the second computer MON acting in monitoring mode are compared to the orders from the first computer COM and, if there is a difference greater than a predetermined threshold between an order from the first computer and a similar order from the second computer, the pair of computers is declared to be faulty. This pair of computers then becomes inactive and another pair of computers becomes active in its place.

Each avionic computer comprises a processing unit labelled "Proc" in the figure. This processing unit comprises, for example, a microprocessor or a microcontroller. Each avionic computer also comprises a switch of a communication network, labelled SW in the figure. In the example illustrated in the figure, this switch has 5 bidirectional communication ports, labelled S, C, 1, 2, 3 in the figure. However, another number of communication ports may be contemplated without departing from the scope of the invention. The communication port S is connected to a communication port of the processing unit Proc of the avionic computer under consideration. According to a first alternative, the processing unit Proc and the switch SW of an avionic computer are located on one and the same electronic board. According to a second alternative, the processing unit Proc and the switch SW of an avionic computer are located on two separate electronic boards integrated into one and the same physical housing and supplied with electric power by one and the same electric power supply.

For each pair 121, 122, 123, 124 of avionic computers, according to one alternative, the first computer COM acting in control mode and the second computer MON acting in monitoring mode are integrated into separate physical housings. According to another alternative, the first computer COM acting in control mode and the second computer MON acting in monitoring mode are integrated into one and the same physical housing.

The switches SW of the two computers COM and MON of one and the same pair of computers are connected to one another by their respective ports labelled C. In the example illustrated in FIG. 2A, the ports 1, 2, 3 of the switches SW of the computers COM of each of the pairs of avionic computers 121, 122, 123, 124 are connected to ports of the switches SW of the computers COM of the other pairs of avionic computers.

Figure 3A:
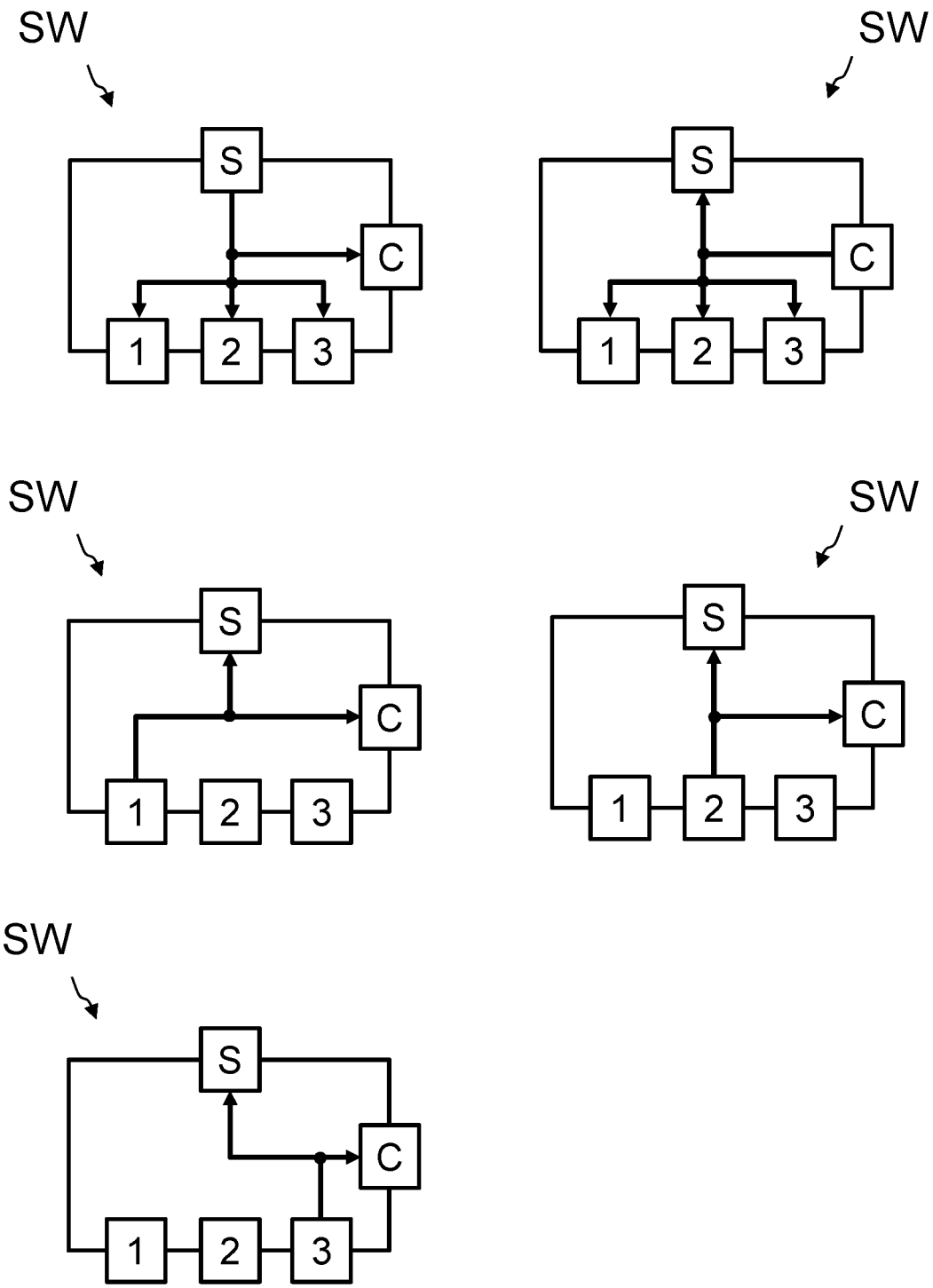
FIG. 3A illustrates the configuration of a switch of the avionic system illustrated in FIG. 2A.

Each switch SW is configured such that it routes the data frames received on its input ports to its output ports in a manner predefined only on the basis of the input ports on which these data frames are received. FIG. 3A illustrates the configuration common to the various switches SW of FIG. 2A. FIG. 3A illustrates the routing, to the output ports of a switch, of the data frames received on each of its input ports. A data frame received on the input port S is thus routed to the 4 output ports C, 1, 2, 3. A data frame received on the input port C is routed to the 4 output ports S, 1, 2, 3. A data frame received on any one of the input ports 1, 2 or 3 is routed to the 2 output ports C and S.

This configuration of the various switches, coupled to the abovementioned set of links between switches, as illustrated in FIG. 2A, makes it possible to establish a communication link between each switch associated with an avionic computer and each of the switches associated with the other avionic computers of the set of avionic computers. This configuration of the various switches is such that, when an avionic computer sends a data frame via the switch associated with this avionic computer, this data frame is transmitted to all of the other avionic computers of the set of avionic computers. Thus, for example, when the avionic computer 121c sends a data frame to the switch SW that is associated therewith, this data frame is received by this switch via its communication port S. As indicated above with reference to FIG. 3A, the switch routes this data frame to its output ports C, 1, 2 and 3. The data frame routed to the output port C is received by the input port C of the switch associated with the computer 121m, which routes it to its output port S destined for the computer 121m. The data frame routed to the output port 1 of the switch associated with the computer 121c is received by the input port 1 of the switch associated with the computer 123c, which routes it firstly to its output port S destined for the computer 123c and secondly to its output port C destined for the switch associated with the computer 123m. This switch receives this data frame on its input port C and it routes it to its output port S destined for the computer 123m. The data frame routed to the output port 2 of the switch associated with the computer 121c is received by the input port 1 of the switch associated with the computer 122c, which routes it firstly to its output port S destined for the computer 122c and secondly to its output port C destined for the switch associated with the computer 122m. This switch receives this data frame on its input port C and it routes it to its output port S destined for the computer 122m. The data frame routed to the output port 3 of the switch associated with the computer 121c is received by the input port 1 of the switch associated with the computer 124*c*, which routes it firstly to its output port S destined for the computer 124*c* and secondly to its output port C destined for the switch associated with the computer 124*m*. This switch receives this data frame on its input port C and it routes it to its output port S destined for the computer 124*m*. Any data frame sent by the computer 121*c* to the switch SW that is associated therewith is thus transmitted to all of the other avionic computers of the avionic system 10. Similarly, any data frame sent by any of the other avionic computers 121*m*, 122*c*, 122*m*, 123*c*, 123*m*, 124*c*, 124*m* is transmitted to all of the other avionic computers of the avionic system 10.

Advantageously, the data frames exchanged between the avionic computers of the set of avionic computers are in accordance with the ARINC 664 part 7 standard (version in force as of the filing date of this application, or any replacement standard). Although these data frames use virtual links, these data frames are not decoded by the switches associated with the avionic computers of the avionic system 10. As indicated above, a data frame sent by an avionic computer of the set of avionic computers is transmitted to all of the other avionic computers of the set of avionic computers. Upon receiving a data frame, the avionic computers check whether the data frame is intended for them, and they filter the frames for which they are not the intended recipients. This makes it possible to facilitate the routing of the data frames by the various switches, since these perform the routing identically regardless of their position in the avionic system 10. In addition, these switches do not need to analyze the received data frames to decode the corresponding virtual links in order to resend these data frames on the basis of routing tables. The switches are thus simplified. In addition, integrating the switches into the avionic computers makes it possible to simplify the implementation of the avionic system 10.

Figure 2B:
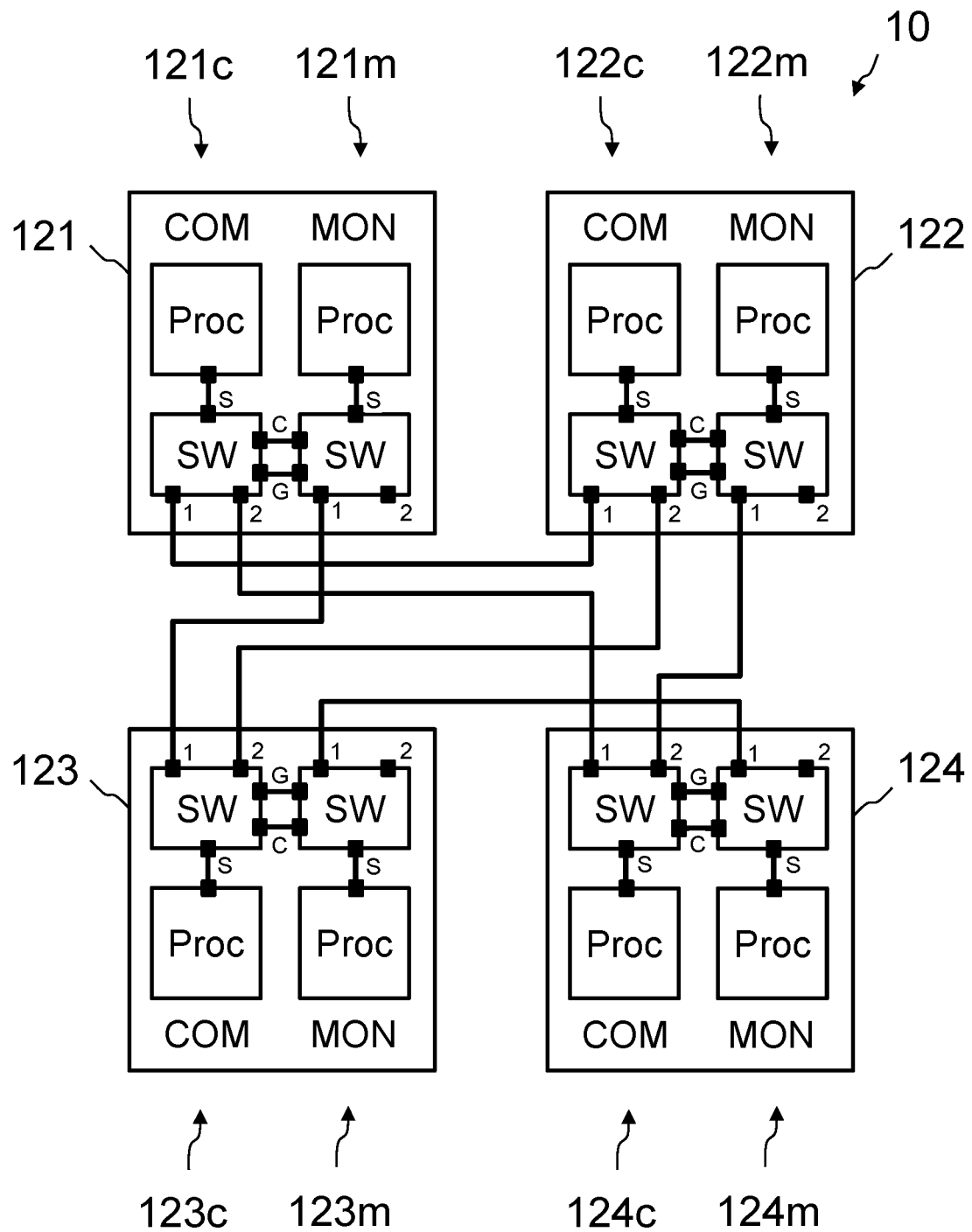
FIG. 2B schematically illustrates an avionic system according to another embodiment of the invention.

In one variant embodiment of the avionic system 10 shown in FIG. 2B, the switches SW associated with the avionic computers each have 5 bidirectional communication ports, labelled S, C, G, 1, 2 in the figure. The communication port S of each switch is connected to a communication port of the processing unit Proc of the avionic computer with which this switch is associated. The switches SW of the two computers COM and MON of one and the same pair of computers are connected to one another firstly by their respective ports labelled C, and secondly by their respective ports labelled G. In the example illustrated in FIG. 2B, three of the ports 1, 2 of the switches SW of the computers COM and MON of each of the pairs of avionic computers 121, 122, 123, 124 are connected to ports of the switches SW of the computers COM and MON of the other pairs of avionic computers.

Figure 3B:
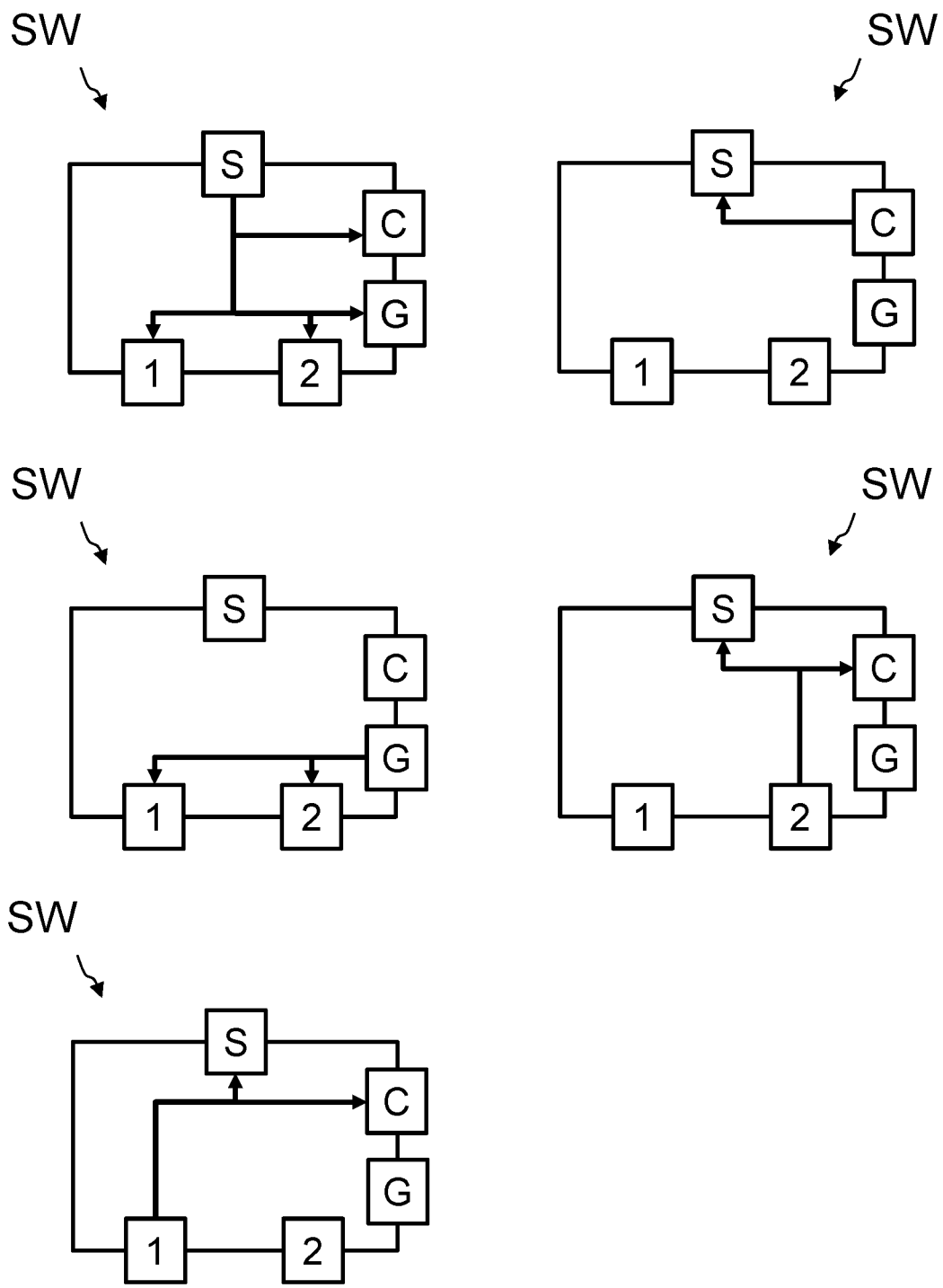
FIG. 3B illustrates the configuration of a switch of the avionic system illustrated in FIG. 2B.

Each switch SW is configured such that it routes the data frames received on its input ports to its output ports in a manner predefined only on the basis of the input ports on which these data frames are received. FIG. 3B illustrates the configuration common to the various switches SW of FIG. 2B. FIG. 3B illustrates the routing, to the output ports of a switch, of the data frames received on each of its input ports. A data frame received on the input port S is thus routed to the 4 output ports C, G, 1, 2. A data frame received on the input port C is routed to the output port S. A data frame received on the input port G is routed to the output ports 1 and 2. A data frame received on either one of the input ports 1 or 2 is routed to the 2 output ports C and S.

This configuration of the various switches, coupled to the abovementioned set of links between switches, as illustrated in FIG. 2B, makes it possible to establish a communication link between each switch associated with an avionic computer and each of the switches associated with the other avionic computers of the set of avionic computers. This configuration of the various switches is such that, when an avionic computer sends a data frame via the switch associated with this avionic computer, this data frame is transmitted to all of the other avionic computers of the set of avionic computers, as in the avionic system illustrated by FIGS. 2A and 3A.

In one particular embodiment not shown in the figures, for each pair of avionic computers COM and MON, the switch associated with the computer COM is also the switch associated with the computer MON. This makes it possible to implement a single switch common to the two computers of each pair of computers.

In one advantageous embodiment, a maximum bandwidth is allocated to each input port of each switch SW associated with an avionic computer. This switch is then configured so as to monitor the reception of data frames on an input port and to reject received frames if the maximum bandwidth allocated to this input port is exceeded. The maximum bandwidth may be characterized by a minimum time interval between two consecutive data frames of a data flow, also called BAG (bandwidth allocation gap). In particular, in addition to the BAG, the maximum bandwidth is also characterized by a maximum jitter value. These concepts of BAG and jitter are similar to those used in a communication network in accordance with the ARINC 664 part 7 standard. In particular, the switch is configured so as to monitor the reception of data frames on an input port in accordance with a token bucket principle. According to this principle, a counter is incremented in accordance with a predefined time period. When a data frame is received on the input port under consideration of the switch, if the current value of the counter is greater than or equal to a predetermined value, the counter is decremented by the predetermined value. The switch then accepts the received data frame. If not, when the current value of the counter is less than this predetermined value, the switch rejects the received data frame by not retransmitting the data frame on any of its output ports. The predetermined value corresponds to the value of the BAG. The incrementation of the counter at each time period is subject to saturation depending on the value of the jitter: for a zero jitter value, the counter is saturated at the predetermined value corresponding to the BAG. Thus, upon the authorized reception of a data frame, with the counter being decremented by the predetermined value, its value returns to zero. It is then necessary to wait for at least a duration corresponding to the BAG to be able to accept the reception of a new data frame, this actually corresponding to the definition of a zero jitter value. For a positive jitter value, the saturation value of the counter is equal to the predetermined value corresponding to the BAG plus a value corresponding to the jitter. Thus, after the authorized reception of a data frame, with the counter being decremented by the predetermined value, its value returns to a value corresponding to the jitter.

In particular, when the avionic system is configured such that an input port of a switch SW is supposed to receive N data flows, N being an integer greater than 1, the reception of the data frames on this input port is monitored by implementing N counters similar to the abovementioned counter corresponding to a token bucket principle. The N data flows may, for example, correspond to N virtual links when the data frames are in accordance with the ARINC 664 part 7 standard. Each of the N counters is incremented at each time period. When a data frame is received, one of the N counters, having the highest current value from among the current values of the N counters, is taken into consideration. The principle of accepting or declining the received data frame is implemented on the basis of this counter, similarly to the abovementioned principle implemented with the single counter of a conventional token bucket. Thus, if the current value of this counter is greater than or equal to a predetermined value, the counter is decremented by the predetermined value. The switch then accepts the received data frame. If not, when the current value of the counter is less than this predetermined value, the switch rejects the received data frame by not retransmitting the data frame on any of its output ports. Implementing the N counters makes it possible to precisely monitor the BAG and the jitter of the N communication flows able to be received by the communication port of the switch.

In particular, all of the data frames exchanged between the avionic computers of the set of avionic computers are of identical sizes, corresponding to a predetermined size. Advantageously, a switch associated with an avionic computer is configured so as to reject the reception of a data frame on an input port if the size of the data frame is different from the predetermined size.

As in the case of a communication network in accordance with the ARINC 664 part 7 standard, the avionic system according to the invention may undergo mathematical analysis of the flows on its various communication links in order to determine the maximum end-to-end latencies on the various links between the equipment of the avionic system (thereby making it possible to verify that these latencies are in accordance with the specifications of the avionic system) and in order to determine a minimum required size for each of the buffers associated with the various communication ports. This mathematical analysis also makes it possible to determine the maximum flows on the various communication links and to accordingly configure the maximum bandwidth allocated to each input port of each switch.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An avionic system of an aircraft, said avionic system comprising:
   a set of avionic computers; and
   a switch associated with each avionic computer of the set of avionic computers, each switch comprising a set of input ports and a set of output ports;
   wherein, for each avionic computer of the set of avionic computers, the avionic system comprises a communication link between the switch associated with this avionic computer and each of the switches associated with the other avionic computers of the set of avionic computers,
   wherein:
   each switch is configured such that such switch routes data frames received on its input ports to its output ports in a predefined manner only based on the input ports on which these data frames are received and the predefined manner routes data to the output ports is different for at least two of the input ports; and
   the various switches are configured such that, when an avionic computer sends a data frame via the switch associated with this avionic computer, this data frame is transmitted to all of the other avionic computers of the set of avionic computers.

2. The avionic system according to claim 1, wherein the switch associated with each avionic computer is integrated into said avionic computer.

3. The avionic system according to claim 1,
   wherein the set of avionic computers comprises pairs of avionic computers, such that each pair comprises a first computer acting in control mode and a second computer acting in monitoring mode monitoring the first computer and
   wherein, for each pair of computers, the switch associated with the first computer is also the switch associated with the second computer.

4. The avionic system according to claim 1, wherein a maximum bandwidth is allocated to each input port of each switch associated with an avionic computer and said switch is configured to monitor the reception of data frames on an input port and to reject received frames if the maximum bandwidth allocated to this input port is exceeded.

5. The avionic system according to claim 4, wherein the switch is configured to monitor the reception of data frames on an input port in accordance with a token bucket principle.

6. The avionic system according to claim 4, wherein the system is configured to allow a transmission of a number N of data flows via an input port of a switch, N being an integer greater than 1, and said switch is configured so as to monitor the reception of data frames on an input port in accordance with a token bucket principle by implementing N token bucket counters, a counter of the counters having a highest value being decremented when a data frame is received on the input port if this highest value is high enough to authorize a reception of the data frame.

7. The avionic system according to claim 1, wherein the data frames exchanged between the avionic computers of the set of avionic computers are of identical sizes, corresponding to a predetermined size.

8. The avionic system according to claim 7, wherein a switch associated with an avionic computer is configured to reject a reception of a data frame on an input port if the size of said data frame is different from said predetermined size.

9. The avionic system according to claim 1, wherein the data frames exchanged between the avionic computers of the set of avionic computers are in accordance with the ARINC 664 part 7 standard.

10. The avionic system according to claim 1, wherein all of the switches are configured similarly to route the data frames received on their input ports to their output ports in the predefined manner only based on the input ports on which these data frames are received.

11. The avionic system according to claim 1, wherein the system corresponds to a flight control system of the aircraft and the avionic computers of the set of avionic computers are flight control computers of the aircraft.

12. An aircraft comprising an avionic system according to claim 1.

* * * * *